United States Patent
Chow et al.

(10) Patent No.: US 12,130,822 B2
(45) Date of Patent: Oct. 29, 2024

(54) GENERATING PREDICTED CONTACTS FOR A PHONE APPLICATION

(71) Applicant: VMware, Inc., Palo Alto, CA (US)

(72) Inventors: Adam Chow, Chamblee, GA (US);
Ravish Chawla, Atlanta, GA (US);
Rohit Pradeep Shetty, Bangalore (IN);
Max Blinder, Atlanta, GA (US)

(73) Assignee: Omnissa, LLC, Mountain View, CA (US)

( * ) Notice: Subject to any disclaimer, the term of this patent is extended or adjusted under 35 U.S.C. 154(b) by 386 days.

(21) Appl. No.: 17/457,371

(22) Filed: Dec. 2, 2021

(65) Prior Publication Data

US 2023/0177057 A1 Jun. 8, 2023

(51) Int. Cl.
*G06F 16/2457* (2019.01)
*H04M 1/27453* (2020.01)
*H04M 1/72454* (2021.01)
*H04M 1/72457* (2021.01)

(52) U.S. Cl.
CPC .. *G06F 16/24575* (2019.01); *H04M 1/27453* (2020.01); *H04M 1/72454* (2021.01); *H04M 1/72457* (2021.01)

(58) Field of Classification Search
CPC . H04W 4/14; G06Q 30/0633; G06Q 30/0601; H04M 1/72433; H04M 1/27453; H04M 1/72457; H04M 1/72454; H04M 1/2753; G06F 16/24575
See application file for complete search history.

(56) References Cited

U.S. PATENT DOCUMENTS

| | | | |
|---|---|---|---|
| 2010/0228560 A1* | 9/2010 | Balasaygun | H04M 1/2746 |
| | | | 705/1.1 |
| 2012/0278076 A1* | 11/2012 | Lloyd | G10L 15/22 |
| | | | 704/E15.001 |
| 2018/0113913 A1* | 4/2018 | Lee | H04L 51/216 |
| 2021/0073213 A1* | 3/2021 | Richardson | G06F 16/2379 |

* cited by examiner

*Primary Examiner* — Farid Seyedvosoghi
(74) *Attorney, Agent, or Firm* — Kim & Stewart LLP

(57) ABSTRACT

Disclosed are various embodiments for generating a list of predicted contacts that can be provided to a client device. The predicted contacts can be generated based upon an analysis of user interaction data. The predicted contacts can be made available to a phone application or messaging application on a client device so that contact information can be displayed in response to an incoming call or a message.

20 Claims, 4 Drawing Sheets

100

GENERATING PREDICTED CONTACTS FOR A PHONE APPLICATION

BACKGROUND

In a bring-your-own-device (BYOD) or an enterprise-issued device environment, users can have tens, hundreds, or even thousands of contacts in multiple contact databases on their devices. For example, a user might have multiple accounts synchronized to their mobile devices, each with its own set of contacts that are also synchronized to the device. Additionally, a user may have and enterprise accounts with which the user's device is synchronized, which can have locally stored contacts in a contact database as well as a global address list that is stored remotely from the mobile device. In some large enterprises, the global address list with which the user's contact database is synchronized may only comprise a subset of all contacts in the enterprise. For example, the global address list with which the users device is synchronized might only include contacts for a particular group or location within an enterprise. As a result, the users device may not be synchronized with users within the enterprise who may work from a different location or group.

Many users may not have all contacts within an enterprise stored within their personal address book. In fact, storing too many contacts from an enterprise directory onto a mobile device can consume an inordinate amount of device storage in a contact database. However, in some instances a user's mobile device can receive a voice call from a contact within or external to the enterprise, where the contact is not stored locally on the user's device. In this scenario, a phone application or a dialer application that renders a call screen on the display of the mobile device is unable to display the name or any other information about the caller other than the phone number.

In today's environment where spam calls are prevalent, some users may have formed a habit to decline any call from a phone number that is not associated with a contact stored on the user's device where that is within a global address list to which the phone application has access. As a result, these users risk declining potentially important calls from other users within the enterprise or external to the enterprise.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
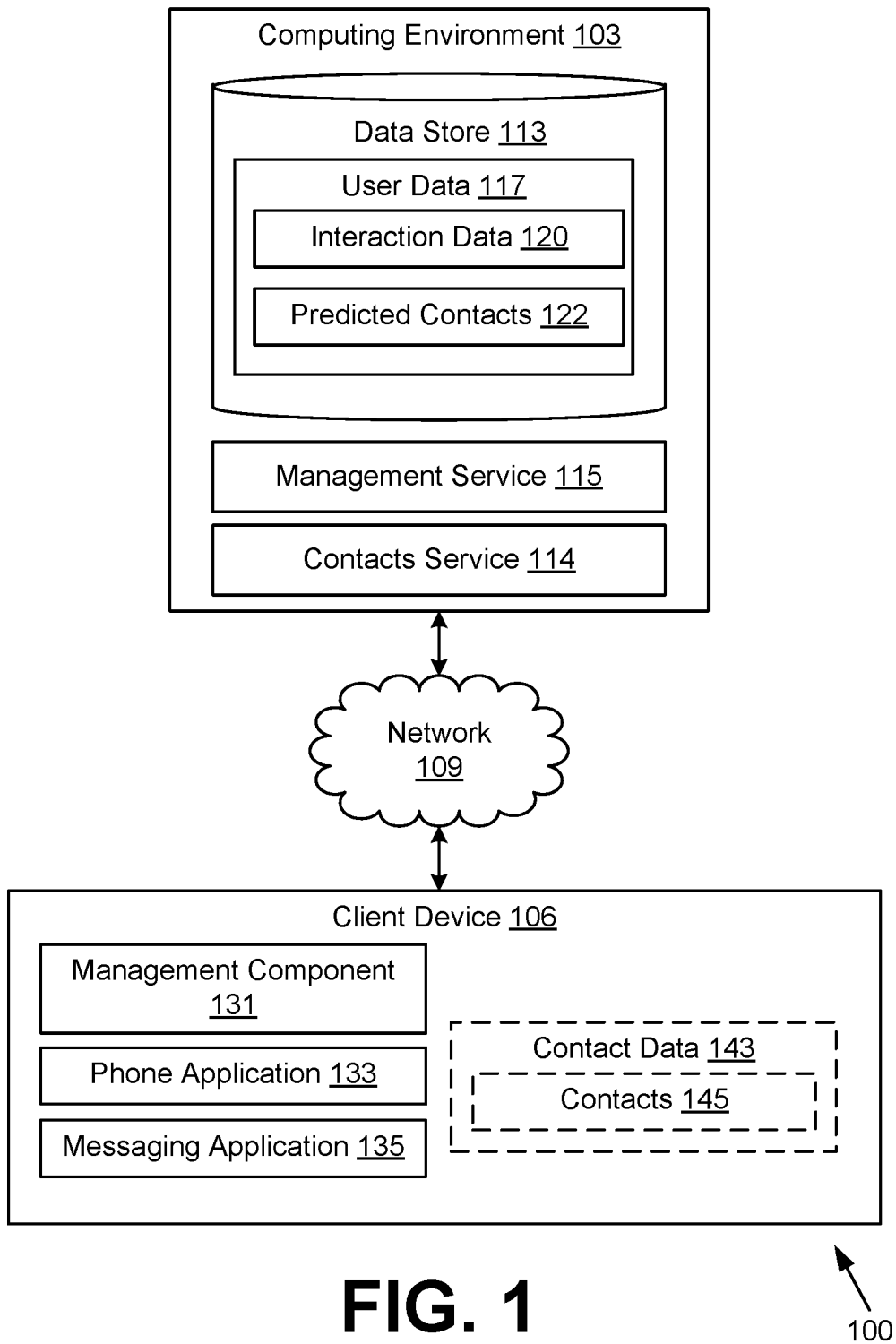
FIG. 1 is a drawing of a networked environment according to various embodiments of the present disclosure.

The present disclosure is related to generating a list of predicted contacts with which a given user is likely to communicate. The predicted contacts can be synchronized with the user's device so that a phone application, or a dialer application, running on a user's mobile device can access the predicted contacts in addition to contacts that are otherwise synchronized with the device. The phone application can access contacts to display information about an incoming caller should the phone number from which the incoming caller is calling match a contact stored on or accessible to the device.

For example, in a smartphone environment, a phone application running on the device can communicate with the telephony services provided by a carrier or a voice-over-IP system to place and receive calls on behalf of a user. When the user places a call, or when the device on which the application is running receives a call, the phone application can determine whether a phone number associated with the other side of a call is associated with a contact that is stored on or accessible to the smartphone. If the phone number associated with the other side of a call is associated with such a contact, the phone application can display certain information about the contact, such as the contact's first name or last name.

In event of an incoming call to a smartphone from a number that is not associated with a contact accessible to the device, a phone application often displays an indication that the incoming call is from an unknown number. In some cases, the phone application only displays the phone number. In event of an incoming call to a smartphone from a number that is associated with a contact accessible to the device, a phone application often information about the contact, such as the first name and/or last name of the contact.

In today's environment where spam calls are prevalent, some users may have formed a habit to decline any call from a phone number that is not associated with a contact stored on the user's device that is stored as a contact on the user's device or within a global address list to which the phone application has access. As a result, these users risk declining potentially important calls from other users within the enterprise or external to the enterprise.

As one example, a user may be traveling abroad for business and receive a call from a contact associated with a location. The user might receive a call from security personnel, or a person associated with the location to which the user is traveling. If the contact is not stored on or accessible to the user's device through a global address list accessible to the device, a call from the contact may not be displayed with identifying information other than a phone number, which many users are likely to decline.

Examples of the disclosure operate by dynamically creating a list of predicted contacts for a user based upon a user's interactions and predicted interactions. The predicted contacts can be identified based upon contacts with which the user has interacted, contacts within an organizational hierarchy in an enterprise, people with whom the user is likely to interact based upon a role within an organization, seasonal interactions, or contacts associated with a location. Predicted contacts can also be identified based upon contacts surfaced from third party products, services, or data sources, such as email, calendar, messaging services, or other products and services with which users interface.

With reference to FIG. 1, shown is a networked environment 100 according to various embodiments. The networked environment 100 includes a computing environment 103 and a client device 106, which are in data communication with each other via a network 109. The network 109 includes, for example, the Internet, one or more intranets, extranets, wide area networks (WANs), local area networks (LANs), wired networks, wireless networks, other suitable networks, or any combination of two or more such networks. For example, such networks may comprise satellite networks, cable networks, Ethernet networks, telephony networks, and other types of networks.

The computing environment 103 can comprise, for example, a server computer or any other system providing computing capability. Alternatively, the computing environment 103 can employ a plurality of computing devices that can be arranged, for example, in one or more server banks, computer banks, or other arrangements. Such computing devices can be located in a single installation or can be distributed among many different geographical locations. For example, the computing environment 103 can include a plurality of computing devices that together can comprise a hosted computing resource, a grid computing resource, and/or any other distributed computing arrangement. In some cases, the computing environment 103 can correspond to an elastic computing resource where the allotted capacity of processing, network, storage, or other computing-related resources can vary over time. The computing environment 103 can also include or correspond to one or more virtualized server instances that are created in order to execute the functionality that is described herein.

Various applications or other functionality can be executed in the computing environment 103 according to various embodiments. Also, various data is stored in a data store 113 that is accessible to the computing environment 103. The data store 113 can be representative of a plurality of data stores 113 as can be appreciated. The data stored in the data store 113, for example, is associated with the operation of the various applications and/or functional entities described below.

The components executed on the computing environment 103, for example, can include a management service 115, contacts service 114, and other applications, services, processes, systems, engines, or functionality not discussed in detail herein. The management service 115 can manage and/or oversee the operation of multiple client devices 106. For example, an enterprise can operate the management service 115 to ensure that the client devices 106 that are enrolled as managed devices are operating in compliance with various compliance rules. By ensuring that the client devices 106 are operated in compliance with the compliance rules, the employer can control and protect access to various data. The management service 115 can also facilitate access to email, calendar data, contact information, documents, or other enterprise data to which an enterprise may wish to provide access by users via client devices 106.

In some embodiments, the management service 115 can also determine compliance of client devices 106 associated with a particular user with compliance rules in response to a request received from an application executed by a client device 106. The computing environment 103 can also execute other applications to facilitate interactions with a client device 106, such as an application distribution service that distributes applications and/or updates to applications to the client device 106, a mail server that provides email services and/or functionality, a document storage application that provides remote document storage capability for users of an enterprise, or other applications or services that an enterprise can deploy to provide services for its users. Description of such applications or services is not necessary for a complete understanding of embodiments of the disclosure.

The management service 115 can cause configuration profiles and other configuration data to be installed on a client device 106. For example, certificate profiles that provide a client device 106 with access to a certain network can be installed on the client device 106 by the management service 115. As another example, the management service 115 can push configuration profiles that include contacts or contact data to the client device 106. The management service 115 can rely upon management application programming interfaces (API's) provided by an operating system of the client device 106 that allows the management service 115 to remotely manage the client 106. Examples of this disclosure can leverage the management capability provided by the operating system of the client device 106 to install contacts on a client device 106.

The data stored in the data store 113 includes, for example, user data 117 and potentially other data. The user data 117 can include data associated with a user account, such as user profile information. User profile information can include information about a user's role within an organization, an office address or location, home address or location, permissions, and/or privileges with respect to usage of an enterprise device.

User data 117 can also include access settings, such as authentication credentials, delegation settings (e.g., information about other users who may be provided access to the user data 117 of a particular user), mail and document retention rules and/or policies, and/or other geographic access restrictions or limitations (e.g., information about certain locations and/or networks from which user data 117 can be accessed). User data 117 can also include other account settings, such as biographical or demographic information about a user, password reset information, multi-factor authentication settings, authentication tokens, and other data related to a user account. User data 117 can also include other forms of data associated with users of an enterprise's computing resources that are not shown, such as a user's mailbox data, calendar data, contact data, and information about the various devices, such as device identifiers, that are assigned to the user and managed in some form by the management service 115. For example, mailbox data includes data associated with one or more mailboxes corresponding to a user account of a user.

Calendar data can include, for example, appointments, reminders, tasks and/or other data that can be associated with a timestamp or date stamp. Calendar data can include appointments that are associated with a particular location and/or user. For example, an appointment can be linked with a particular location, meeting room, building, address, or other location. An appointment can also be linked with another user who is internal or external to an organization or domain of the user as well as with text and/or attachments. Calendar data can also include tasks, reminders, or other types of data that can be associated with a time and/or place and placed on a calendar.

Contact data can include address book information related to contacts of a particular user such as internal or external email addresses, telephone contact information, mailing addresses, contact notes, and other information associated with contacts that a user may wish to maintain in an address book or contacts store. Contact data can also include user specific address book data as well as global address book data for address books that are shared among multiple users in a domain and/or enterprise. Contact data can be synchronized with a contacts database that is stored on the client device 106. In some examples, a client device 106 can be synchronized with other mailboxes, contacts, and/or calendars that are separate from an enterprise-provided account. For example, the operating system or an application on the client device 106 can allow a user to add a personal email account that is synchronized with a contacts database on the client device 106. The contacts database can be accessible to a phone application running on the client device 106 can handles the placing or receiving of voice calls. The phone application can access a contacts database on the client device 106 to render information about an incoming call by matching a phone number associated with the call to a contact in the contacts database on the client device 106. User data 117 can include interaction data 120 corresponding to users. Interaction data 120 can include data regarding user interactions from which a list of predicted contacts can be generated and pushed to the client device 106. Interaction data 120 can include data based on various factors.

Interaction data 120 can include information about recent interactions with other users within or external to the enterprise. This information can be obtained by the contacts service 114 based upon an analysis of the email of the user, messaging interactions within messaging services provided by the enterprise, and interactions with others in conferencing services utilized by the enterprise.

Interaction data 120 can also incorporate data from an organization hierarchy that can be determined from a user directory within the enterprise or an identity management service. Interaction data 120 can also include data from email and messaging interactions within email and messaging services provided by the enterprise to its users. Interaction data 120 can also include the identity of other users with which the user is likely to interact based on the user's role with an organization, such as a group within a directory service to which the user is assigned.

Interaction data 120 can also include seasonal interactions. For example, users might interact with other users during high volume or high interest sales periods relative to other times of the year. Such data can be obtained by observing general usage patterns of the user or of another user in the same role preceding the current user. Interaction data 120 can further include general support contacts and location specific general contacts when an employee is traveling. For example, an employee visiting India from the USA can have security and other general contacts of the India office synced automatically to his device as a predicted contact.

Interaction data 120 can include other location specific contacts, such as teams with which the user s likely to interact at a new location, including support contacts mentioned above. Interaction data 120 can include executive support contacts, or users for business related support not specifically technical support. The contacts service 114 can select location specific contacts by determining from a user's calendar or device location that the user is traveling to or near a particular location associated with the enterprise.

User data 117 can also include predicted contacts 122. Predicted contacts 122 can be generated by the contacts service 114 based upon an analysis of interaction data 120 and potentially other user data 117. The predicted contacts 122 can include a subset of full contact information associated with the contacts so that the contact data other than a phone number of the contact is inaccessible when the predicted contacts 122 are synchronized with the client device 106.

Predicted contacts 122 can also be manually sourced. Contacts that are not part of an employee address book or accessible through a global address list can be manually added to the predicted contacts 122 by an administrative user or by the user through a user interface provided by the contacts service 114. The predicted contacts 122 stored on the client device 106 of a user can be separate from a global address list.

Predicted contacts 122 can also be added based upon an analysis of email content, such as the identity of senders, email signatures of emails received by a user. The contacts service 114 can analyse email signatures to extract phone numbers and contact names from email signatures and added to the interaction data 120 as predicted contacts 122. The contacts service 114 can extract contact information from the signatures could be extracted to include additional information missing from a main contact card in some examples.

The contacts service 114 can generate predicted contacts 122 on behalf of users within the enterprise. The predicted contacts 122 can be generated based upon an analysis of interaction data 120 and other information about users, such as the user's calendar, email, messaging interactions in internal or external messaging services, and other data sources. The contacts service 114 can maintain an updated predicted contacts 122 entry for one or more users within an enterprise. The predicted contacts 122 can be identified based upon various factors, such as frequency of contact with a particular contact. The factors can be weighted, with frequency of contact being a highest rated factor in some examples.

The predicted contacts 122 can be fully or partially synchronized with a user. In some cases, the contacts service 114 can synchronize a highest weighted N contacts from the predicted contacts 122 with a client device 106 of the user. In some implementation, the contacts service 114 can synchronize all predicted contacts 122 with a confidence score greater than a threshold with the client device 106.

The contacts service 114 can synchronize predicted contacts 122 with a client device 106 by generated a configuration profile that contains contacts to store on the client device 106. The configuration profile can be installed onto the client device 106 by causing the management service 115 to provide the configuration profile to the management component 131, which can store the contacts as contact data 143 on the client device 106. The storing of contacts on the client device 106 can utilize a managed contacts feature of an operating system of the client device 106 that allows for a management service 115 to store contacts on a client device 106 in a contacts database or contact data 143. In one example, the storing of contacts on the client device 106 can utilize the CallKit if in iOS to store a local copy of a contact, such as the name number of a contact, so that the local copy of the contact can be accessed by the phone application 133 or messaging application 135.

The client device 106 is representative of a plurality of client devices that can be coupled to the network 109. The client device 106 can comprise a computing device. Such a computing device can be embodied in the form of a desktop computer, a laptop computer, a personal digital assistant, a cellular telephone, a smartphone, or any other device with like capability. The client device 106 can include a display that comprises, for example, one or more devices such as liquid crystal display (LCD) displays, organic light emitting diode (OLED) displays, or other types of display devices.

The client device 106 can be configured to execute various applications, such as a management component 131. The management component 131 can be executed by the client device 106 upon startup of the client device 106. The management component 131 can also be executed as a background process by the client device 106. The management component 131 can be installed with elevated privileges on the client device 106 and have elevated rights to install profiles, certificates and/or oversee the operation of the client device 106 on behalf of the management service 115. The management component 131 can be installed by a user and/or device administrator and facilitate access to user data 117 by a user of the client device 106. For example, the management component 131 can be executed by a user to facilitate provisioning of a device and/or configuration of software to facilitate access to user data 117 and/or other enterprise resources.

The phone application 133 can be executed to facilitate placing and/or receiving calls to various contacts that can be stored on the client device 106 or other phone numbers. The phone application 133 can be launched by a user of the client device 106 in order to initiate a call to a phone number or launched by the operating system of the client device 106 in response to detecting an incoming call. For example, the phone application 133 can be interoperable with telephony capabilities of an operating system associated with the client device 106 to facilitate a user input of a phone number and/or a user selection of a phone number and then initiate a call via the telephony capabilities of the client device 106. Such telephony capabilities may allow for the placing of voice calls via a wireless carrier through which the client device 106 can communicate.

In some examples, a messaging application 135 can facilitate sending and/or receiving of SMS messages or other messages from other messaging formats to various contacts that may be stored on the client device 106 or other phone numbers. The messaging application 135 can be launched by a user of the client device 106 in order to send an SMS message to another client device 106. For example, the messaging application 135 can be interoperable with telephony or messaging capabilities of an operating system associated with the client device 106 to facilitate a user input of a phone number and/or a user selection of a contact identifier. Then, the messaging application 135 can facilitate messaging via the telephony or messaging capabilities of the client device 106. Such capabilities may allow for messaging via a wireless carrier through which the client device 106 can communicate.

Contact data 143 can also be stored on the client device 106. In some embodiments, contact data 143 can be obtained from the computing environment 103 by the management component 131 or other application or service executed by the client device 106. In some examples, contact data 143 and can be synchronized with user data 117 corresponding to a user associated with the client device 106. The contact data 143 can also be synchronized with a third email service utilized by the enterprise or an email service with which the user has synchronize the client device 106, such as a personal email account. Contact data 143 can comprise one or more contacts with which a user can initiate communication with the phone application 133 and/or the messaging application 135. Accordingly, a particular contact may be associated with multiple contact identifiers, such as various phone numbers, email addresses, VoIP identifiers, or other contact identifiers with which the phone application 133, messaging application 135, or other application can initiate communication with a contact.

A contact 145 can be an entry within the contact data 143. A contact 145 can include information about a contact, such as a first name, last name, phone number, email address, and other contact identifiers. The phone application 133 and messaging application 135 can rely upon contact data 143 to display identifying information from a contact 145 about incoming or outgoing calls or messages. The information can include a contact's name or other identifying information. For example, when an incoming call is received by the phone application 133, the phone application 133 can determine if the phone number of the caller corresponds to a contact 145 by determining that the number matches that of a contact 145 within the contact data 143. The phone application 133 can display the contact name in a user interface in response to an incoming call from a number that matches a contact 145. Similarly, the messaging application 135 can display the contact name in a user interface in response to an incoming message or with a message conversation from a number that matches a contact 145.

Figure 2:
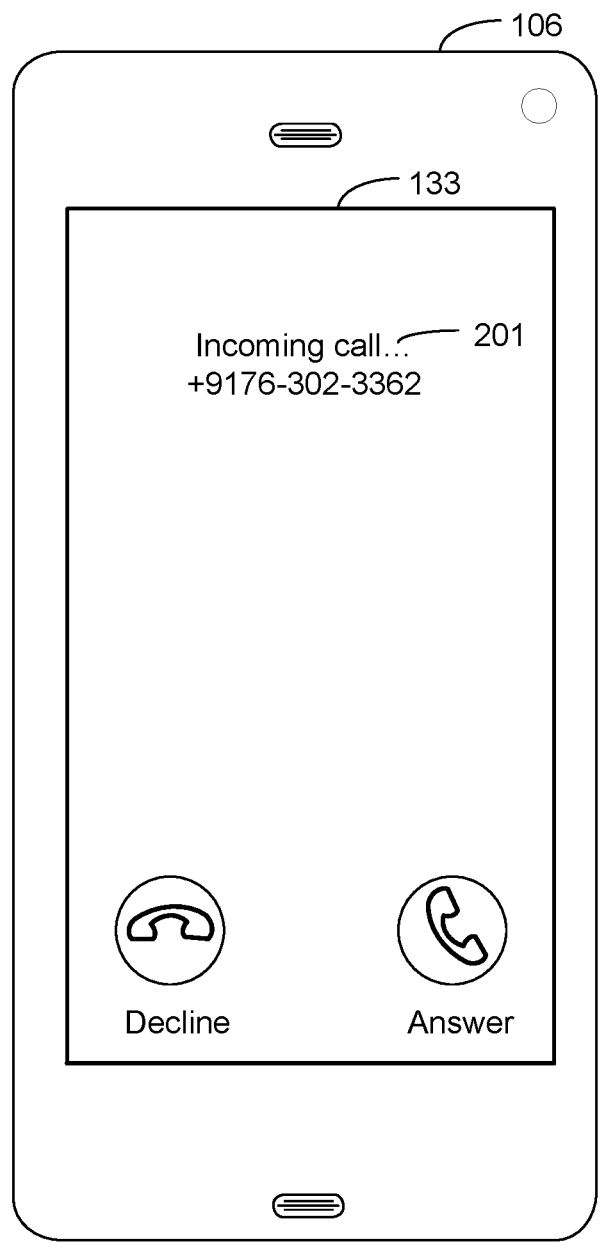
FIG. 2 is a pictorial diagram of an example user interface rendered by a client device in the networked environment of FIG. 1 according to various embodiments of the present disclosure.

To illustrate a scenario, reference is made to FIG. 2, which illustrates a user interface generated by the phone application 133. In the example of FIG. 2, the phone application 133 is rendering a user interface in response to detecting an incoming call. In some examples, a phone application 133 can determine whether a contact 145 in contact data 143, or a contacts database stored on a phone, corresponds to the incoming call. In the example of FIG. 2, the user's device does not have access to a contact 145 corresponding to the phone number of the incoming call.

In some examples, the phone application 133 can search the contact data 143 stored locally on the device as well as query a global address list (GAL) associated with one or more user accounts. The GAL can be an address book associated with an enterprise or a group within the enterprise. The GAL can be stored remotely from the client device 106 and/or mirrored within contact data 143. In some examples, the GAL can be accessed by utilizing an API that permits remote querying of an address book stored on a server that is remote from the client device 106. The phone application 133 can query the GAL with a phone number using a query or request defined by the API.

As shown in FIG. 2, the phone number associated with the incoming call is unavailable in the contact 145 or via a query of a GAL accessible to the client device 106. Accordingly, the phone application 133 is unable to display in a call indicator 201 any additional information about the incoming caller. Therefore, the call indicator 201 displays the phone number of the incoming call.

As noted above, many users might avoid answering such as a call because the user's client device 106 indicates that the caller is unknown to them. However, in certain scenarios, the call might be important to the user. For example, the caller might be a potential client, a sales contact, or a user within the enterprise. The caller might be a security desk associated with an office the user is visiting that might be different from the office at which the user is typically located. The caller might be a sales contact calling to close a deal with the user but whose number is not saved in the contact data 143 or accessible with a GAL search because the user is not in the enterprise directory. There are many reasons why a call from an unknown number might be important. Accordingly, examples of the disclosure can generate predicted contacts 122 that are deployed to the client device 106 and stored as contacts 145 in contact data 143.

Therefore, once the contacts service 114 has generated predicted contacts 122 for a user based upon the interaction data 120 of the user, the management service 115 can cause the predicted contacts 122 to be stored on the client device 106. The phone application 133 or messaging application 135 can then access the predicted contacts 122 that are stored as contacts 145 on the device whenever an incoming call is received, when displaying a call history user interface, or when displaying a message conversation between a user and one or more of the predicted contacts 122.

Figure 3:
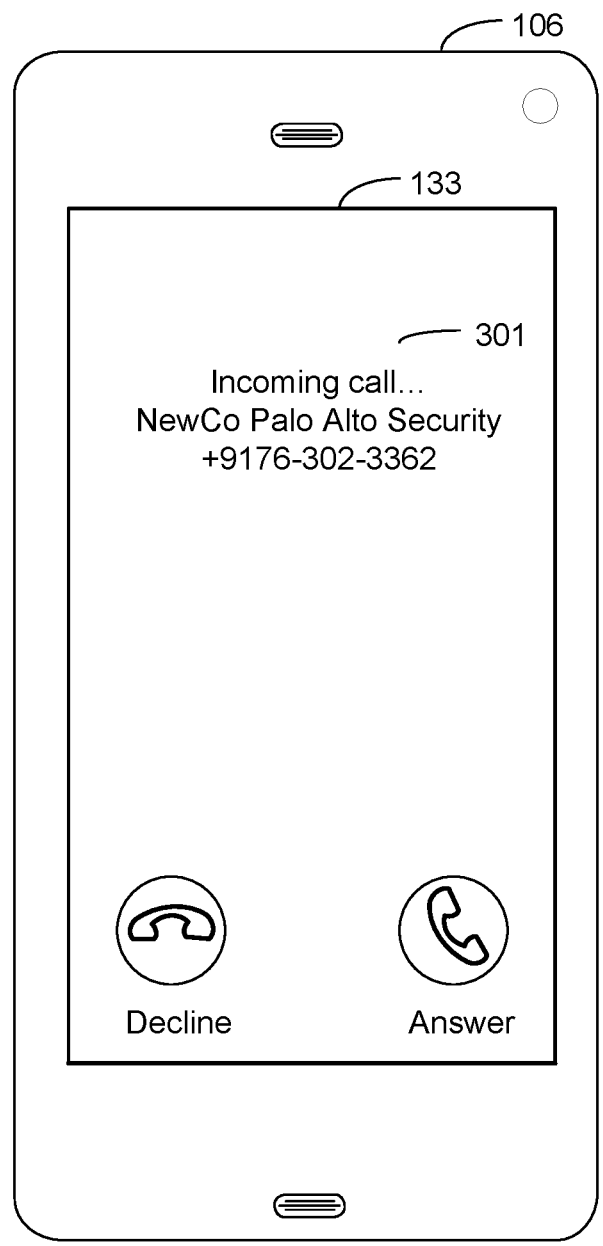
FIG. 3 is a pictorial diagram of an example user interface rendered by a client device in the networked environment of FIG. 1 according to various embodiments of the present disclosure.

Reference is now made to FIG. 3, which illustrates an example of the phone application 133. In the example of FIG. 3, the phone application 133 has accessed contact data 143 to determine that an incoming call is associated with a contact 145 stored on the client device 106. The contact 145 can be stored on the client device using a managed contacts feature of an operating system or contacts database on the client device 106. The contact 145 can be stored by the management service 115 in response to the contacts service 114 generating predicted contacts 122 for the user based upon an analysis of the interaction data 120 as well as the user's location, calendar appointments, and other data that the management service 115 can make accessible about the user.

The management service 115 can deploy a list or database of predicted contacts 122 to the client device 106 by creating a configuration profile or other type of dataset that includes the predicted contacts 122. The configuration profile can be pushed to the phone application 133, which can store the predicted contacts 122 within the contact data 143. As noted above, the predicted contacts 122 can be saved to a contact database on the client device 106 using an interface such as CallKit in iOS or Connection Service in Android. These interfaces can allow the phone application 133 to save contact data to the client device 106 that can accessed by the phone application 133 and/or the messaging application 135.

Accordingly, because the phone number associated with the incoming call is associated with a contact stored on the client device 106 by the management service 115 that has deployed predicted contacts 122 generated by the contacts service 114, the call indicator 301 can display a contact name associated with the incoming call. By displaying a contact name, the chances of the user answering the incoming call are improved.

The phone application 133 or messaging application 135 running on the client device 106, in response to an incoming call or an incoming message, can first query local contacts database, such as contact data 143 or another contact database on the client device 106. If a number associated with a call or message is found within the contact data 143, the phone application 133 or messaging application 135 can then identify a contact display name associated with the phone number and display the name within the call indicator 301.

Figure 4:
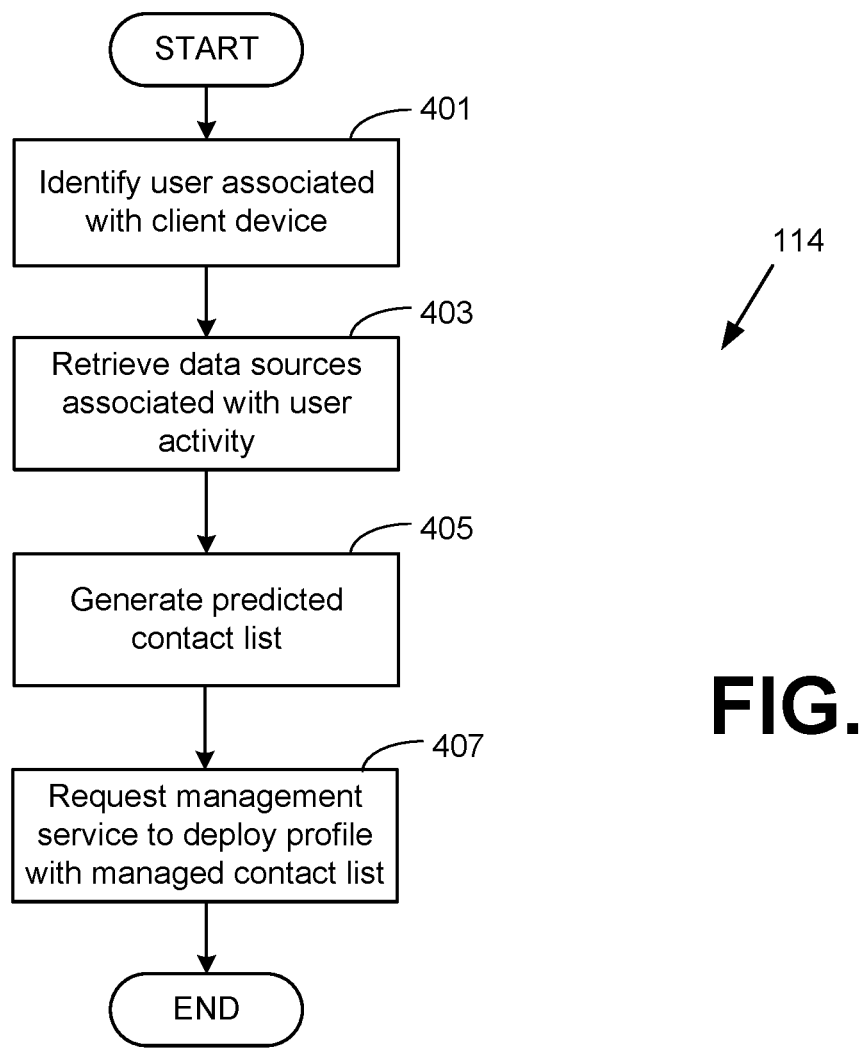
FIG. 4 is a flowchart illustrating one example of functionality implemented as portions of an application executed in a computing environment in the networked environment of FIG. 1 according to various embodiments of the present disclosure.

Referring next to FIG. 4, shown is a flowchart that provides one example of the operation of a portion of the contacts service 114 according to various embodiments. It is understood that the flowchart of FIG. 4 provides merely an example of the many different types of functional arrangements that may be employed to implement the operation of the portion of the contacts service 114. As an alternative, the flowchart of FIG. 4 may be viewed as depicting an example of elements of a method implemented in the computing environment 103 according to one or more embodiments. Additionally, it should be appreciated that the functionality shown as implemented by the contacts service 114 can also be implemented by the management service 115 or other services or applications.

First, at step 401, the contacts service 114 can identify a user associated with a client device 106. The client device 106 can be one of a population of managed devices that are enrolled with the management service 115. As noted above, the management service 115 can send contacts for storage in a contacts database on the client device 106 by virtue of the fact that the client device 106 is managed by the management service 115.

At step 403, the contacts service 114 can retrieve data sources associated with user activity, such as interaction data 120. The interaction data 120 can include information about contacts that is extracted from emails of the user, administrator specified priority contacts that should be present on all devices managed by the management service 115, third party or internal messaging services utilized by users of the enterprise, interactions within conferencing services utilized by the enterprise, or group contacts that are associated with groups of users within the enterprise. The interaction data 120 can also include a social graph associated with the user that identifies users with which the user associated with the client device 106 is linked. In one example, the contacts service 114 can identify predicted contacts 122 based upon a degree of separation from a user in a user graph or a social graph. For example, the fewer number of degrees of separation from a user in the graph, the higher ranked a potential predicted contact can be ranked as a predicted contact.

The data sources associated with the user activity can be provided to a machine learning process or a data analysis process that can generate a list of predicted contacts 122 by analyzing the interaction data 120. The contacts service 114 can utilize an interaction ranker that can ingest data from interaction data 120, such as people with which the user talks using the client device 106, messages with on messaging platforms and conferencing services, and other platforms to build a frequency chart. The interaction data 120 can be ranked based on additional attributes that are available to contacts service 114, such as organizational level (respective to the user) and frequency of contacting to provide a set of contacts that are important to the user based on user interaction.

A graph searching algorithm utilized by the contacts service 114 can utilize a user knowledge graph that contains information about multiple contact entities and connect them based on how they relate to each other. The user knowledge graph can connect users based on their organization, team and collaborations. The graph search algorithm can be used to search the knowledge graph starting from the main user node, to a depth level that obtains a set of users that are most important to the user.

The contacts service 114 can utilize user interaction data by analyzing patterns and trends. In addition to information ranking, attributes such as location, administrative assignments, and node-edge relationships from the knowledge graph and apply pre-trained models to extract useful insights based on the data. Location based contacts can be provided through pattern analysis and a geographic filtering algorithm. The location models can provide location information to the contacts and keep an always updated database of globally available contacts for each location. The algorithm can return a set of important contacts for a user when they switch to a new geographic location and can provide this information to the pattern analysis algorithms as well.

Information extraction algorithms can be used for selecting contact information from emails, confluence pages and other 3rd party sources. For example, contact information would be found in email signatures, which can be used to update a user's contact in the address book. These contacts, when returned by data providers, can include relevant information without the user's involvement.

Based upon the multi-faceted analysis of interaction data 120, the contacts service 114 can generate predicted contacts 122 associated with the user.

At step 407, the contacts service 114 can request the management service 115 to deploy a configuration profile incorporating one or more of the predicted contacts 122 generated at step 405. The management service 115 can cause configuration profiles and other configuration data to be installed on a client device 106. For example, certificate profiles that provide a client device 106 with access to a certain network can be installed on the client device 106 by the management service 115. As another example, the management service 115 can push configuration profiles that include contacts or contact data to the client device 106. The management service 115 can rely upon management application programming interfaces (API's) provided by an operating system of the client device 106 that allows the management service 115 to remotely manage the client 106. Examples of this disclosure can leverage the management capability provided by the operating system of the client device 106 to install contacts on the client device 106.

The predicted contacts 122 can be stored on the client device 106 as partial contacts so that only a phone number and a contact name is stored on the client device 106 and other contact information, such as an email address, physical address, and other contact details are omitted from the contact data stored on the client device 106. By storing partial contacts on the client device 106, the full contact information of the contact is protected from harvesting by other applications on the client device 106 that may have access to the contact data 143 on the client device 106.

Although the management component 131, phone application 133, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows an example of the functionality and operation of an implementation of portions of the contacts service 114. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 can be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including contacts service 114, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the contacts service 114, phone application 133, messaging application 135, etc., can be implemented and structured in a variety of ways. For example, one or more applications described can be implemented as modules or components of a single application. Further, one or more applications described herein may be executed in shared or separate computing devices or a combination thereof. For example, a plurality of the applications described herein may execute in the same computing device and/or client device 106, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A non-transitory computer-readable medium embodying instructions executable by at least one processor, the instructions causing the at least one processor to at least:
   identify a user associated with a client device, wherein the client device is enrolled as a managed device with a management service and has a phone application that has access to a list of contacts stored in the client device;
   identify predicted contacts associated with the user and generate a score for each of the predicted contacts based upon at least one of interactions with the user, a location associated with the user, and a degree of separation from the user in a user graph;
   generate a configuration profile comprising a plurality of the predicted contacts having a score greater than a threshold; and
   provide the configuration profile to be installed in the client device, wherein the configuration profile installed on the client device causes the phone application to add the plurality of the predicted contacts to the list of contacts stored in the client device so that an incoming call from a caller, which is one of the plurality of the predicted contacts added to the list of contacts, triggers a display of information about the caller on the client device.

2. The non-transitory computer-readable medium of claim 1, wherein the plurality of the predicted contacts is separate from a global address list accessible to the client device.

3. The non-transitory computer-readable medium of claim 1, wherein the configuration profile comprises partial contact information for the plurality of the predicted contacts, the partial contact information comprising a display name and a phone number and omitting other contact information about the plurality of the predicted contacts.

4. The non-transitory computer-readable medium of claim 1, wherein the client device stores the plurality of the predicted contacts in a local contact database accessible by the phone application on the client device.

5. The non-transitory computer-readable medium of claim 1, wherein the interactions with the user include interactions with the user in a messaging service, a conferencing service, or in an email.

6. The non-transitory computer-readable medium of claim 1, wherein the location associated with the user includes a location specified in a calendar entry on a calendar of the user.

7. The non-transitory computer-readable medium of claim 1, wherein the client device has a messaging application that has access to the list of contacts stored in the client device, and an incoming message from one of the plurality of the predicted contacts added to the list of contacts, triggers a display of a contact name associated with the one of the plurality of the predicted contacts.

8. A system, comprising:
   at least one computing device; and
   an application executable by the at least one computing device, the application causing the at least one computing device to at least:
   identify a user associated with a client device, wherein the client device is enrolled as a managed device with a management service and has a phone application that has access to a list of contacts stored in the client device;
   identify predicted contacts associated with the user and generate a score for each of the predicted contacts based upon at least one of interactions with the user, a location associated with the user, and a degree of separation from the user in a user graph;
   generate a configuration profile comprising a plurality of the predicted contacts having a score greater than a threshold; and
   provide the configuration profile to be installed in the client device, wherein the configuration profile installed on the client device causes the phone application to add the plurality of the predicted contacts to the list of contacts stored in the client device so that an incoming call from a caller, which is one of the plurality of the predicted contacts added to the list of contacts, triggers a display of information about the caller on the client device.

9. The system of claim 8, wherein the plurality of the predicted contacts is separate from a global address list accessible to the client device.

10. The system of claim 8, wherein the configuration profile comprises partial contact information for the plurality of the predicted contacts, the partial contact information comprising a display name and a phone number and omitting other contact information about the plurality of the predicted contacts.

11. The system of claim 8, wherein the client device stores the plurality of the predicted contacts in a local contact database accessible by the phone application on the client device.

12. The system of claim 8, wherein the interactions with the user include interactions with the user in a messaging service, a conferencing service, or in an email.

13. The system of claim 8, wherein the location associated with the user includes a location specified in a calendar entry on a calendar of the user.

14. The system of claim 8, wherein the client device has a messaging application that has access to the list of contacts stored in the client device, and an incoming message from one of the plurality of the predicted contacts added to the list of contacts, triggers a display of a contact name associated with the one of the plurality of the predicted contacts.

15. A method, comprising:
   identifying a user associated with a client device, wherein the client device is enrolled as a managed device with a management service and has a phone application that has access to a list of contacts stored in the client device;
   identifying predicted contacts associated with the user and generating a score for each of the predicted contacts based upon at least one of interactions with the user, a location associated with the user, and a degree of separation from the user in a user graph;
   generating a configuration profile comprising a plurality of the predicted contacts having a score greater than a threshold; and
   providing the configuration profile to be installed in the client device, wherein the configuration profile installed on the client device causes the phone application to add the plurality of the predicted contacts to the list of contacts stored in the client device so that an incoming call from a caller, which is one of the plurality of the predicted contacts added to the list of contacts, triggers a display of information about the caller on the client device.

16. The method of claim 15, wherein the plurality of the predicted contacts is separate from a global address list accessible to the client device.

17. The method of claim 15, wherein the configuration profile comprises partial contact information for the plurality of the predicted contacts, the partial contact information comprising a display name and a phone number and omitting other contact information about the plurality of the predicted contacts.

18. The method of claim 15, wherein the client device stores the plurality of the predicted contacts in a local contact database accessible by the phone application on the client device.

19. The method of claim 15, wherein the interactions with the user include interactions with the user in a messaging service, a conferencing service, or in an email.

20. The method of claim 15, wherein the location associated with the user includes a location specified in a calendar entry on a calendar of the user.

* * * * *